(12) United States Patent  
Negre

(10) Patent No.: US 9,664,499 B2
(45) Date of Patent: May 30, 2017

(54) METHOD FOR DETERMINING THE ANGULAR OFFSET BETWEEN THE ROTOR AND THE STATOR OF AN ELECTRICAL MACHINE OF A MOTOR VEHICLE

(71) Applicant: RENAULT s.a.s., Boulogne-Billancourt (FR)

(72) Inventor: Edouard Negre, Montigny le Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 400 days.

(21) Appl. No.: 14/398,063

(22) PCT Filed: Apr. 19, 2013

(86) PCT No.: PCT/FR2013/050868
§ 371 (c)(1),
(2) Date: Oct. 30, 2014

(87) PCT Pub. No.: WO2013/164527
PCT Pub. Date: Nov. 7, 2013

(65) Prior Publication Data
US 2015/0134284 A1    May 14, 2015

Related U.S. Application Data

(60) Provisional application No. 61/654,370, filed on Jun. 1, 2012.

(30) Foreign Application Priority Data

Apr. 30, 2012  (FR) ..................... 12 53965

(51) Int. Cl.
*G01R 13/00* (2006.01)
*G01R 15/00* (2006.01)
(Continued)

(52) U.S. Cl.
CPC ................ *G01B 7/30* (2013.01); *G01D 5/12* (2013.01); *H02P 6/16* (2013.01); *H02P 21/18* (2016.02);
(Continued)

(58) Field of Classification Search
CPC .. G01B 7/30; G01D 5/12; H02P 21/18; H02P 21/32; H02P 6/16; H02P 2203/03
(Continued)

(56) References Cited

U.S. PATENT DOCUMENTS 7,023,170 B2 * 4/2006 Yasukawa ............... H02P 27/04
                                                                318/705
7,352,151 B2 * 4/2008 Fujitsuna ................ H02P 6/185
                                                                318/712
(Continued)

FOREIGN PATENT DOCUMENTS

DE   10 2010 017 411    12/2011
EP       1 014 554       6/2000
(Continued)

OTHER PUBLICATIONS

French Search Report Issued Aug. 28, 2012 in French Application No. 1253965 Filed Apr. 30, 2012.

*Primary Examiner* — An Do
(74) *Attorney, Agent, or Firm* — Oblon, McClelland, Maier & Neustadt, L.L.P.

(57) ABSTRACT

The invention relates to a method for determining the angular offset between the rotor and the stator of an electrical machine for driving a motor vehicle, the rotor being supplied with a rotor-energizing current and voltage, the stator being supplied over three phases with stator-phase currents and voltages, wherein the method includes the following steps: verifying that the electrical machine is stopped; applying a rotor-energizing signal for an amount of (Continued)

time capable of causing the partial magnetization of the rotor; applying a rotor-de-energizing signal capable of causing an active and rapid demagnetization of the rotor, while measuring, during the magnetization, the stator-phase currents and maintaining zero voltage among the phases of the stator; determining the direct stator currents and quadrature stator currents corresponding to the stator-phase currents measured by applying Park and Clarke transforms and in accordance with a measurement of the electrical position of the rotor; determining the maximum values among the direct and quadrature stator currents; transmitting an angular offset fault signal if the absolute value of the maximum quadrature stator signal is greater than a threshold value; determining a correction of the angular offset in radians by calculating the tangent arc of the maximum quadrature stator current value divided by the maximum value of the direct stator current.

7 Claims, 2 Drawing Sheets

(51) Int. Cl.
*H02P 23/00* (2016.01)
*G01B 7/30* (2006.01)
*H02P 6/16* (2016.01)
*G01D 5/12* (2006.01)
*H02P 21/32* (2016.01)
*H02P 21/18* (2016.01)

(52) U.S. Cl.
CPC .......... *H02P 21/32* (2016.02); *H02P 2203/03* (2013.01)

(58) Field of Classification Search
USPC .............................. 702/57, 66; 318/719, 799
See application file for complete search history.

(56) References Cited

U.S. PATENT DOCUMENTS

| | | | |
|---|---|---|---|
| 9,035,581 B2* | 5/2015 | Hirono | H02P 6/182 318/400.02 |
| 2005/0104551 A1 | 5/2005 | Nishimura et al. | |
| 2006/0012328 A1 | 1/2006 | Yasukawa et al. | |

FOREIGN PATENT DOCUMENTS

| | | |
|---|---|---|
| FR | 2 874 466 | 2/2006 |
| JP | 6 165561 | 6/1994 |
| JP | 2006 136123 | 5/2006 |

* cited by examiner

METHOD FOR DETERMINING THE ANGULAR OFFSET BETWEEN THE ROTOR AND THE STATOR OF AN ELECTRICAL MACHINE OF A MOTOR VEHICLE

The invention relates to the technical field of electrical machines, and more particularly to the control of such machines.

The principle of a synchronous machine, also referred to as a synchronous alternating-current electric motor, is to produce a driving or resisting torque on the basis of the interaction of two magnetic fields. One of the fields is referred to as the rotor excitation field, because it is associated with the rotor, the rotating part of the machine. The other field is referred to as the stator field, because it is associated with the stator, the static part of the machine. The stator field is the result of a magnetic flux produced by alternating currents flowing through the phases of the machine. These currents are controlled so as to produce a flux which is synchronous with respect to the rotor, that is to say rotating at the same speed as it. Thus, the stator magnetic field is controlled in quadrature, that is to say controlled in order to be in a constant phase shift of 90° from the rotor field. Such a configuration produces a mechanical torque, driving or braking, depending on whether the phase shift is positive or negative. At high speed, it may be necessary to deflux the rotor by the stator, and to this end to set the phase shift to an angle greater than 90°.

In all cases, in order to control the phase shift of the fields, a system for controlling the stator electric currents requires information about the position of the rotor of the machine. This is obtained by means of a device for measuring the absolute angular position of the rotor with respect to the stator. Such a measuring device is arranged at the center of rotation of the rotor, which is also the origin of the reference coordinates (XA,Xb,Xc) and (d,q,f) illustrated by FIG. 2.

In most cases, this measuring device is not positioned precisely enough to directly provide an absolute angular position, but rather a relative angular position. The relative angular position is offset by a constant angular offset with respect to the absolute angular position. It is thus necessary to provide the system with the angular offset value so that it can calculate the absolute angular position. This is done during a determination or learning procedure. Once this offset has been determined and stored by the system for controlling the stator electric currents, the angular measurement device is operational, and the stator currents can be produced with an adequate phase with respect to the rotor of the machine.

The prior art comprises procedures for learning the angular offset, also referred to as the position measurement offset, consisting in orientation of the rotor on the stator by alignment of the stator and rotor magnetic fields. These procedures therefore require rotation of the rotor over one or more revolutions, without a mechanical load on the rotor.

Most of the industrial applications of synchronous machines are speed control applications in which the initial starting phase tolerates a certain delay in the application of the torque. In these cases, a device without a sensor, with a position estimator, may be envisioned.

The following documents are also known from the prior art.

Documents DE 1020 100 174 11 A1 and WO 20 1203 825 A2 disclose a method for compensating for an angular offset of the position measurement by using the electromotive force of the machine and detecting the crossing through 0 V.

Document EP 10 145 54 A2 discloses a method for detecting a position measurement error and for adaptive correction by correlation between currents and voltages in the synchronous Park plane.

Document JP 2006 136 123 A discloses the control, without a sensor, of a synchronous machine having a wound rotor. The addition of an alternating voltage generator to the supply circuit of the rotor makes it possible to create an oscillation of the excitation, producing an induced voltage in the stator and making it possible to obtain an estimate of the position of the rotor.

In the case of application to automobile powertrains, rotation of the rotor without a load involves either disconnecting the rotor from the transmission or raising the vehicle so as to leave the wheels free to rotate.

In the case of first use of a new powertrain, or following replacement of the electrical machine, the angular position sensor or the system for controlling the electric currents, it is necessary to carry out a determination of the position measurement offset. If this is omitted or is not carried out correctly, the motor cannot produce any driving torque, or may even produce a torque in the opposite direction to that which is intended, which may lead to undesirable and potentially dangerous effects.

There is therefore a need for a method for determining an angular offset between a rotor and a stator which is simpler to implement.

The invention relates to a method for determining the angular offset between the rotor and the stator of an electrical machine powering an automobile, the rotor being supplied with a rotor excitation current and voltage, the stator being supplied on three phases with stator phase currents and voltages. The method comprises the following steps. Verifying that the electrical machine is at rest, applying a rotor excitation signal for a duration capable of causing partial magnetization of the rotor, applying a rotor deexcitation signal capable of causing active and rapid demagnetization of the rotor, while measuring the stator phase currents during the demagnetization, and while maintaining zero voltages between the phases of the stator. Then determining direct stator currents and quadrature stator currents, corresponding to the stator phase currents measured by applying the Park-Clarke transformation and as a function of a measurement of the electrical position of the rotor, determining the maximum values among the direct stator currents and the quadrature stator currents, transmitting an angular setting fault signal if the absolute value of the maximum value of the quadrature stator current is greater than a threshold value, and determining an angular offset correction in radians by calculating the arctangent of the ratio of the maximum value of the quadrature stator current and the maximum value of the direct stator current.

Partial magnetization of the rotor may be carried out by causing the appearance of a rotor excitation current greater than a magnetization threshold current.

The demagnetization of the rotor may be carried out by causing a reduction of the rotor excitation current below a demagnetization threshold value.

The rotor excitation signal and the rotor deexcitation signal may be rotor excitation currents or rotor excitation voltages.

The rotor excitation signal and the rotor deexcitation signal may form a pattern selected from among patterns of rectangular, triangular, sinusoidal or Dirac shape.

The maximum values of the direct stator currents and of the quadrature stator currents at the end of demagnetization may be determined, when the rotor excitation current is zero.

The maximum values of the direct stator currents and of the quadrature stator currents may be determined at the start of demagnetization, when the rotor excitation current is maximum.

The maximum values of the direct stator currents and the quadrature stator currents may be determined at a favorable instant in the course of the rotor excitation current or voltage profile, at which the gradient of the rotor excitation current is maximum.

The method has the advantage of being entirely transparent for the user, because it does not require rotation of the rotor or production of a torque.

This method is also rapid because it can be carried out in about 300 to 400 ms, while the generally used conventional procedure described in relation to the prior art requires more than one minute.

This method does not entail any extra cost in its implementation because all the devices required already exist in the control system of the motor.

The method can be carried out systematically before any starting, thus eliminating any risk of an angular setting error of the device for measuring the position of the rotor. Such systematic conduct is impossible with the methods of the prior art.

Other objects, characteristics and advantages will become apparent on reading the following description, given solely by way of nonlimiting example and provided with reference to the appended figures, in which.

Figure 1:
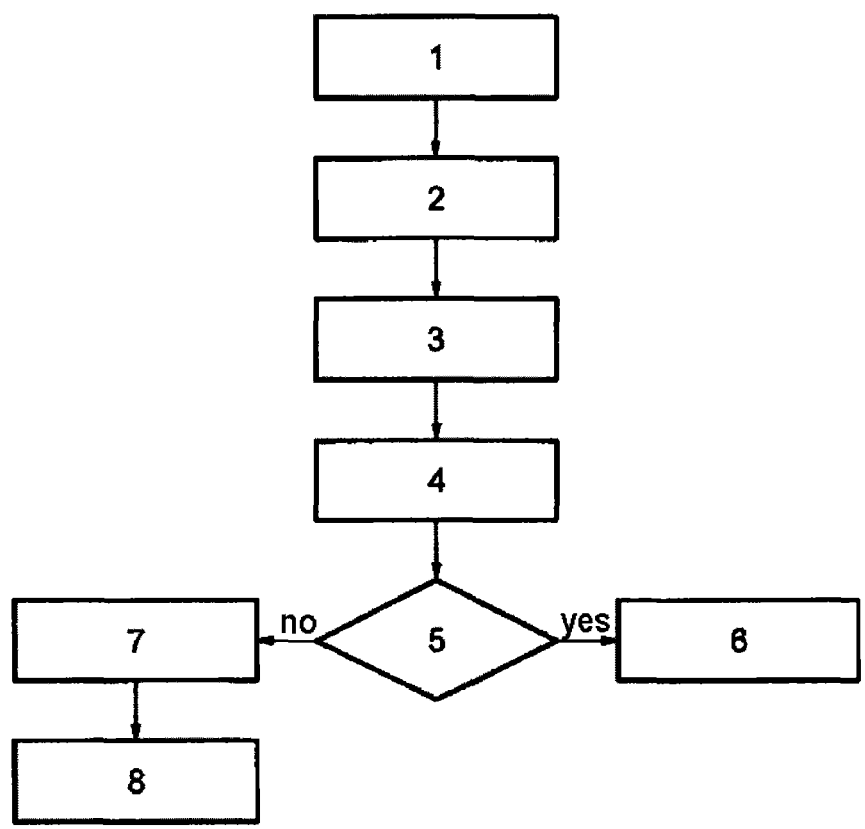
FIG. 1 illustrates the main steps of the method.
Figure 2:
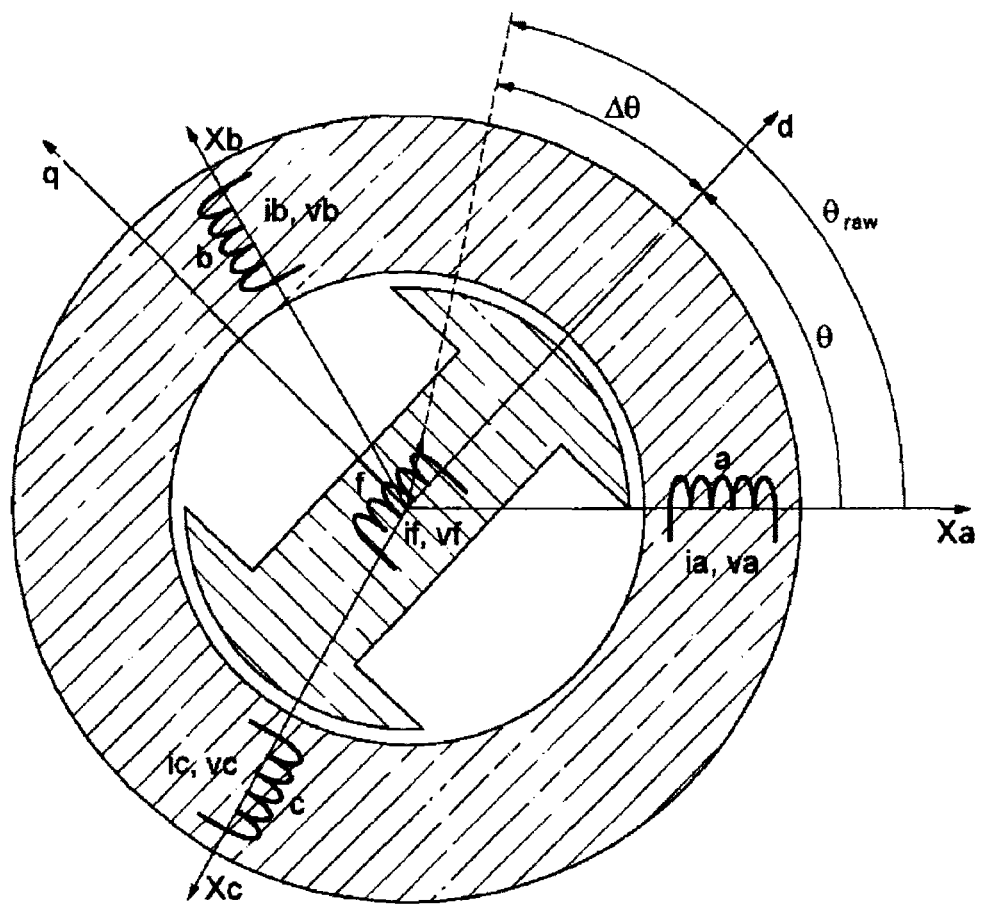
FIG. 2 illustrates the various reference coordinates and angles of an electrical machine.

As seen in the introduction, an electrical machine comprises a stator, the fixed part of the machine, and a rotor, the rotating part connected to the output shaft and making it possible to transmit the mechanical torque produced.

The stator comprises windings, through which the stator currents flow and which produce magnetic fluxes guided by the body of the stator in order to be closed on the rotor.

The rotor comprises windings, through which the rotor excitation current flows and which produce excitation magnetic fluxes which are guided by the body of the rotor in order to be closed on the stator.

The automobile motors to which the present invention relates are synchronous machines having a wound rotor.

According to the prior art, a vector representation of the fluxes and currents according to a Fresnel diagram provides a good model of the machine. The reference frame adopted is a rotating reference frame fixed to the rotor. The axis of the rotor winding is denoted as "direct", d. The axis in quadrature is denoted as q.

The stator currents are represented by a current vector $\vec{i}_s$, a fixed vector with components $i_d$ and $i_q$ in the rotating reference frame ($\vec{d}$, $\vec{q}j$). The direct stator current $i_d$ and the quadrature stator current $i_q$ are obtained on the basis of the measurements of the phase currents of the stator ($i_A$, $i_B$ and $i_C$) and of the electrical position $\Theta$ by means of the Park-Clarke transformation. The rotor excitation current is represented by a vector $\vec{i}_f$ collinear with the axis d.

The stator $\vec{i}_s$ and rotor $\vec{i}_f$ currents produce a magnetic flux $\vec{\Phi}_s$, through the windings of the stator and $\vec{\Phi}_f$ through the winding of the rotor. The stator currents are generated by a voltage vector $\vec{V}_s$ resulting from the voltages between phases produced by a control system. The rotor excitation current is generated by the rotor deexcitation voltage $V_f$ produced by the excitation control system.

The vector electrical equations of the machine are as follows:

$$\vec{V}_s = R_s \cdot \vec{i}_s + \frac{d\vec{\Phi}_s}{dt} \qquad \text{(Eq. 1)}$$

for the stator; and $$V_f = R_f \cdot i_f + \frac{d\Phi_f}{dt} \qquad \text{(Eq. 2)}$$

for the rotor, with $R_s$ being the phase-neutral stator resistance and $R_f$ the rotor winding resistance.

Since the current vector $\vec{i}_s$ can be decomposed into currents $i_d$ and $i_q$, the voltage vector $\vec{V}_s$ can also be decomposed similarly into components $V_d$ and $V_q$, the flux $\vec{\Phi}_s$ also being decomposed into fluxes $\Phi_d$ and $\Phi_q$.

The following system of equations is then obtained:

$$\begin{cases} V_d = R_s \cdot i_d + \frac{\partial \Phi_d}{\partial i_d} \cdot \frac{di_d}{dt} + \frac{\partial \Phi_d}{\partial i_f} \cdot \frac{di_f}{dt} - \omega \cdot \Phi_q \\ V_q = R_s \cdot i_q + \frac{\partial \Phi_q}{\partial i_q} \cdot \frac{di_q}{dt} + \omega \cdot \Phi_q \\ V_f = R_f \cdot i_f + \frac{\partial \Phi_f}{\partial i_f} \cdot \frac{di_f}{dt} + \frac{\partial \Phi_f}{\partial i_d} \cdot \frac{di_d}{dt} \end{cases} \qquad \text{(Eq. 3)}$$

with $\omega$ the angular frequency of the machine (angular velocity multiplied by the number of pole pairs).

At low currents, since the flux levels are low and the machine is not magnetically saturated, these equations can be linearized. The following equations are then obtained:

$$\begin{cases} V_d = R_s \cdot i_d + L_d \cdot \frac{di_d}{dt} + M_f \cdot \frac{di_f}{dt} - \omega \cdot L_q \cdot i_q \\ V_q = R_s \cdot i_q + L_q \cdot \frac{di_q}{dt} + \omega \cdot L_d \cdot i_d \\ V_f = R_f \cdot i_f + L_f \cdot \frac{di_f}{dt} + \frac{3}{2} \cdot M_f \cdot \frac{di_d}{dt} \end{cases} \qquad \text{(Eq. 4)}$$

In particular, at zero speed ($\omega=0$) and if $V_d=V_q=0$, Equation 4 becomes $$\begin{cases} i_d = -\frac{1}{R_s} \cdot \left( L_d \cdot \frac{di_d}{dt} + M_f \cdot \frac{di_f}{dt} \right) \\ i_q = -\frac{L_q}{R_s} \frac{di_q}{dt} \end{cases} \qquad \text{(Eq. 5)}$$

It is to be noted that $i_q$ does not depend on $i_f$. A variation in $i_f$ therefore alters $i_d$ but not $i_q$.

The determination method therefore consists in carrying out a rapid variation in current $i_f$ when the machine is at rest ($\omega=0$) and the stator voltage is zero ($\vec{V}_s=\vec{0}$). This may be obtained by controlling the voltage $V_f$ according to a pattern, for example a step pattern. The effect of this control is magnetization of the rotor followed by rapid demagnetization thereof, which causes the appearance of an induced current in the stator.

By integrating the differential equations for the currents (Eq. 5), for the currents $i_d$, $i_q$ obtained on the basis of the measured phase currents, after a Park-Clarke transformation, an invariant current $i_q$ is obtained in the case in which the position measurement offset is correctly learned, and a current $i_q$ proportional to $i_d$ in the converse case. It is then possible, by observing the variation in the current $i_q$, to carry out a diagnosis of the determination of the offset, for example by comparing the current $i_q$ with a stored detection threshold: if the current $i_q$ exceeds this threshold during the demagnetization, the activation of an angular setting fault signal is triggered.

The real value of the position measurement offset ($\Delta\Theta$ in degrees of arc) can then be obtained by taking the peak current values of $i_d$ and $i_q$, denoted as $i_{d\_dr}$ and $i_{q\_dr}$ at the time of the rapid demagnetization of the rotor, denoted as instant t $d_r$, and applying the following formula:

$$\Delta\theta = \frac{180}{\pi} \cdot \arctan\left(\frac{i_{q\_dr}}{i_{d\_dr}}\right). \qquad (Eq.\ 6)$$

The method for determining the angular offset between the rotor and the stator comprises the following steps, which are illustrated by the single figure.

During a first step 1, the method is initialized. To this end, the fact that the absolute value of the rotation speed $\infty$ is less than a threshold $^{\infty}seu^{il}$ is verified. Alternatively, the method may be initialized each time the control system of the machine is initialized, or only under certain triggering conditions, for example after a maintenance operation.

During the second step 2, the application of an excitation voltage $V_f$ is controlled for a duration capable of causing partial magnetization of the rotor, that is to say causing the appearance of a current $i_f$ greater than a magnetization threshold current. For example, $V_f$=3 0 V may be applied for 0.3 s.

Immediately after the end of the duration of step 2, during a third step 3 a new voltage $V_f$ capable of causing active and rapid demagnetization of the rotor, that is to say reduction of the current $i_f$ below a demagnetization threshold value, is applied. For example, $V_f$=$-V_{bat}$ may be applied, with $V_{bat}$ being the battery voltage.

The rapid variation in $i_f$ induces a current in the stator only along the axis d, as predicted by Equation 5.

The square-wave variation applied to the voltage $V_f$, or to the current setpoint $i_f$, may be replaced with any pattern consisting of a variation in the excitation current capable of causing induction of a current in the stator. Triangular, sinusoidal or Dirac shape variations may be mentioned in particular.

Alternatively, the magnetization and the demagnetization of the rotor may be carried out by controlling the excitation current $i_f$ rather than the voltage $V_f$. This has the advantage of better reproducibility of the current profiles, while accelerating the determination of the offset.

Furthermore, the stator phase currents $i_A$, $i_B$ and $i_C$ are measured during the demagnetization period.

During steps 2 and 3, voltages are applied between zero phases of the stator in order to obtain looping by the phases of the induced stator currents.

During a fourth step 4, the Park-Clarke transformation is applied to the measured currents, as a function of the electrical position measurement of the rotor $\theta_e$ in order to obtain the measured Park currents $i_d$ and $i_q$.

It is to be recalled that the expression of the Park-Clarke transformation is:

$$\begin{pmatrix} i_d \\ i_q \end{pmatrix} = \frac{2}{3} \cdot \begin{bmatrix} \cos(\theta_e) & \cos(\theta_e - 2\pi/3) & \cos(\theta_e - 4\pi/3) \\ -\sin(\theta_e) & -\sin(\theta_e - 2\pi/3) & -\sin(\theta_e - 4\pi/3) \end{bmatrix} \cdot \begin{pmatrix} i_A \\ i_B \\ i_C \end{pmatrix} \qquad (Eq.\ 7)$$

Still during the fourth step, the maximum values among the measurements of the currents $i_d$ and $i_q$ are determined. These maximum values are measured as values $i_{d\_dr}$ and $i_{q\_dr}$. The maximum currents are reached when the gradient of the rotor excitation current is at its maximum. This may be the case at the end of demagnetization, for example, when the current $i_f$ reaches zero.

During a fifth step 5, the value of $i_{q\_dr}$ is compared with a threshold value $i_{q\_max}$.

If the comparison $|i_{q\_dr}| < i_{q\_max}$ is satisfied, there is no setting error. The method ends with a step 6 which consists in approving the control system, allowing the functional mode of the motor to be entered.

In the converse case, an angular setting fault signal is transmitted. This fault expresses a poor angular setting of the measured absolute angular position with respect to the actual position of the rotor with respect to the stator. The consequence of this poor setting would be poor phasing of the stator currents, and therefore of the stator flux, which would induce poor production of the mechanical torque, or even reversal of the running direction of the machine.

The method then continues with step 7, during which a correction of the angular offset $\Delta\Theta$ is determined by applying Equation 6. The correction value of the offset may be transmitted. Alternatively, during an eighth step 8, the corrected value $\theta_{0\_corr}$ of the position measurement offset $\theta_0$ is determined in the following way:

$$\theta_{0\_corr} = \theta_0 - \frac{180}{\pi} \cdot \arctan\left(\frac{i_{q\_dr}}{i_{d\_dr}}\right) \qquad (Eq.\ 8)$$

The corrected offset $\theta_{0_{corr}}$ is applied in the following way:

$$\theta_e = \mathrm{mod}(\theta_{raw} - \theta_{0\_corr}, 360) \qquad (Eq.\ 9)$$

with $\theta_{raw}$ being the raw position measurement provided by the measurement device without angular setting, and $\theta_e$ being the value of the absolute angular position.

It should be noted that the correction of the offset $\theta_0$ is calculated on the basis of the measurements of stator currents induced during the demagnetization. It is also possible to calculate the correction of the offset on the basis of the stator currents measured during the magnetization. In this case, the maximum values of these currents are obtained at the start of the sequence, when the gradient of the current $i_f$ is maximum, or, for example, at the time when it crosses an adjustable predetermined threshold.

The invention claimed is:

1. A method for determining the angular offset between the rotor and the stator of an electrical machine, the rotor being supplied with a rotor excitation current and voltage, the stator being supplied on three phases with stator phase currents and voltages, characterized in that it comprises the following steps:

verifying that the electrical machine is at rest, applying a rotor excitation signal for a duration capable of causing partial magnetization of the rotor, applying a rotor deexcitation signal capable of causing active and rapid demagnetization of the rotor, while measuring the stator phase currents during the demagnetization, and while maintaining zero voltages between the phases of the stator, determining direct stator currents and quadrature stator currents, corresponding to the stator phase currents measured by applying the Park-Clarke transformation and as a function of a measurement of the electrical position of the rotor, determining the maximum values among the direct stator currents and the quadrature stator currents, transmitting an angular setting fault signal if the absolute value of the maximum value of the quadrature stator current is greater than a threshold value, determining an angular offset correction in radians by calculating the arctangent of the ratio of the maximum value of the quadrature stator current and the maximum value of the direct stator current.

2. The method as claimed in claim 1, wherein partial magnetization of the rotor is carried out by causing the appearance of a rotor excitation current greater than a magnetization threshold current.

3. The method as claimed in claim 1, wherein the demagnetization of the rotor is carried out by causing a reduction of the rotor excitation current below a demagnetization threshold value.

4. The method as claimed in claim 1, wherein the rotor excitation signal and the rotor deexcitation signal are rotor excitation currents or rotor excitation voltages.

5. The method as claimed in claim 1, wherein the rotor excitation signal and the rotor deexcitation signal form a pattern selected from among patterns of rectangular, triangular, sinusoidal or Dirac shape.

6. The method as claimed in claim 1, wherein the maximum values of the direct stator currents and of the quadrature stator currents at the end of demagnetization are determined, when the rotor excitation current is zero.

7. The method as claimed in claim 1, wherein the maximum values of the direct stator currents and of the quadrature stator currents are determined at the start of magnetization, when the excitation current reaches an adjustable threshold.

* * * * *